United States Patent
Kalker et al.

(10) Patent No.: US 6,823,006 B2
(45) Date of Patent: Nov. 23, 2004

(54) ADDING FIELDS OF A VIDEO FRAME

(75) Inventors: Antonius Adrianus Cornelis Maria Kalker, Eindhoven (NL); Johan Cornelis Talstra, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 308 days.

(21) Appl. No.: 10/225,383

(22) Filed: Aug. 21, 2002

(65) Prior Publication Data

US 2003/0043922 A1 Mar. 6, 2003

(30) Foreign Application Priority Data

Aug. 24, 2001 (EP) .............................................. 01203194

(51) Int. Cl.[7] .............................. H04B 1/66; H04N 7/12

(52) U.S. Cl. ................... 375/240; 375/240.25; 348/441

(58) Field of Search ....................... 375/240.01, 240.25, 375/240.2; 382/260; 348/446, 448; 380/200

(56) References Cited

U.S. PATENT DOCUMENTS 5,832,135 A * 11/1998 Merhav et al. ............. 382/260
6,658,157 B1 * 12/2003 Satoh et al. ................ 382/239
6,724,939 B1 * 4/2004 Mekuria ..................... 382/233

* cited by examiner

*Primary Examiner*—Chris Kelley
*Assistant Examiner*—Erick Rekstad

(57) ABSTRACT

For some video processing applications, most notably watermark detection (40), it is necessary to add or average (parts of) the two interlaced fields which make up a frame. This operation is not trivial in the MPEG domain due to the existence of frame-encoded DCT blocks. The invention provides a method and arrangement for adding the fields without requiring a frame memory or an on-the-fly inverse DCT. To this end, the mathematically required operations of inverse vertical DCT (321) and addition (322) are combined with a basis transform (323). The basis transform is chosen to be such that the combined operation is physically replaced by multiplication with a sparse matrix (32). Said sparse matrix multiplication can easily be executed on-the-fly. The inverse basis transform (35) is postponed until after the desired addition (33, 34) has been completed.

9 Claims, 3 Drawing Sheets

ADDING FIELDS OF A VIDEO FRAME

FIELD OF THE INVENTION

The invention relates to a method and arrangement for adding field images of an interlaced video frame image received in the form of frame-encoded transform blocks obtained by an image transform.

The invention also relates to a method and arrangement for detecting a watermark embedded in the fields of a plurality of interlaced video frames.

BACKGROUND OF THE INVENTION

Some video processing applications require the two fields of an interlaced video frame to be added or averaged. An example of such an application is watermark detection. International Patent Application WO-A-99/45705 discloses a video watermarking system in which the same watermark is embedded in successive fields of a video signal. The watermark detector of this system accumulates the fields over a number of frames so that the video signal averages to zero, whereas the watermark adds constructively.

Adding (or averaging) the two fields of an interlaced video frame is trivial in the pixel domain, but far from trivial in the digital (MPEG) domain. The reason is that MPEG encoders may have joined the fields of a frame prior to encoding, and produce so-called frame_pictures with DCT blocks containing information from both odd and even fields.

FIGS. 1 and 2 show diagrams to illustrate the problem underlying this invention. FIG. 1 shows one of MPEG's modes of encoding pictures. In this encoding mode, known as frame_pictures with frame_encoded macroblocks, the two fields 11 and 12 are joined together to a frame 13 by interleaving the lines from the two fields. Both fields have the same watermark W embedded. The frame is then subjected to a discrete cosine transform (DCT), which transforms blocks of 8×8 pixels into blocks of 8×8 coefficients. Four DCT blocks collectively constitute a macroblock 14. Each DCT block represents half of the pixels from the first field 11 and half of the pixels from the second field 12.

Because the DCT is a linear transform, the effect of adding DCT-coefficients is the same as adding the corresponding pixels. Accordingly, the accumulation of frames carried out by the watermark detector may be performed in the DCT domain. The inverse DCT may be postponed until after the accumulation is completed. However, the accumulation requires a frame-based memory. Accordingly, the watermark detector of the system disclosed in WO-A-99/45705, in which 128×128 watermark patterns are tiled over each field, requires a 256×128 buffer.

Another trivial way to add the two fields is to perform the inverse DCT on every block as it arrives, then add the odd lines to the even lines, and store the result in a memory. This option only needs a field-based memory (i.e. a 128×128 buffer in the watermark detector), but requires an on-the-fly inverse DCT transform on every DCT block, which is neither attractive from an implementation point of view.

FIG. 2 shows another one of MPEG's modes of encoding pictures. In this encoding mode, known as frame_pictures with field_encoded macroblocks, the two fields 11 and 12 are joined together to a frame 15 by taking 8 consecutive lines from the first field 11, followed by the same 8 lines from the second field 12. The frame is DCT-transformed. Four DCT blocks collectively constitute a macroblock 16. In this encoding mode, a macroblock contains blocks from one field and blocks from the other field, but all of the pixels represented by one DCT block are from the same field. Because the DCT is a linear transform, the effect of adding DCT-coefficients is the same as adding the corresponding pixels. Accordingly, the two vertically adjacent DCT blocks of each macroblock 16 may be added together in the DCT domain. This operation requires a field-based memory. The inverse DCT may be postponed until after the accumulation of all frames is completed. However, this straightforward solution cannot easily be combined with the above-mentioned solutions for adding the fields of frame-encoded macroblocks.

In practice, MPEG frame pictures contain a mix of frame-encoded macroblocks and field-encoded macroblocks. The majority (70.85%) of the macroblocks is frame-encoded. The technically most awkward situation is thus also the most common.

OBJECT AND SUMMARY OF THE INVENTION

It is an object of the invention to provide a method and arrangement for adding fields of an interlaced video image frame, with which the above-mentioned problems are alleviated.

To achieve these and other objects, the method in accordance with the invention comprises the steps of multiplying the frame-encoded blocks with a sparse matrix which is representative of the inverse image transform, field addition, and a predetermined basis transform; and subjecting the result of said multiplication to the inverse of said predetermined basis transform.

The invention exploits the mathematical insight that the operations of inverse DCT and field addition may be followed by a basis transform which is subsequently undone by the inverse of said basis transform. The composed operations (inverse DCT, field addition, and basis transform) are now physically replaced by a single matrix multiplication. The basis transform is chosen to be such that said matrix multiplication is a multiplication with a sparse matrix, i.e. a matrix with few non-zero elements. The sparse matrix multiplication is carried out on-the-fly, but is much easier to implement than an on-the-fly inverse DCT. The method requires a field-based memory only. A further significant advantage of the invention is that execution of the inverse basis transform can be postponed until after all frames (20 or so for watermark detection) have been accumulated in the field memory.

DESCRIPTION OF PREFERRED EMBODIMENTS

Figure 1:
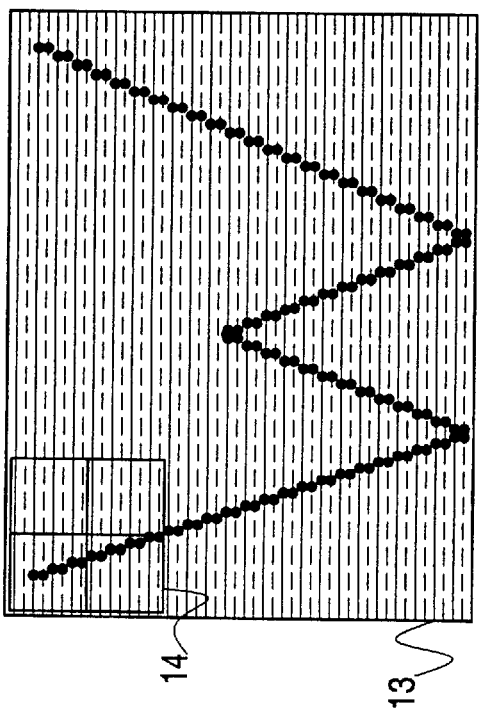
FIGS. 1 and 2 show diagrams to illustrate the problem underlying the invention.
Figure 1:
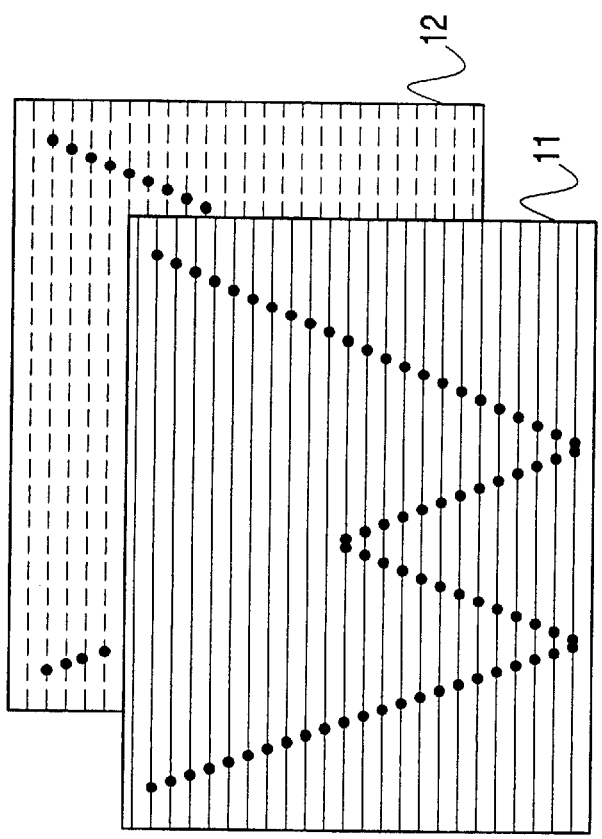
Figure 3:
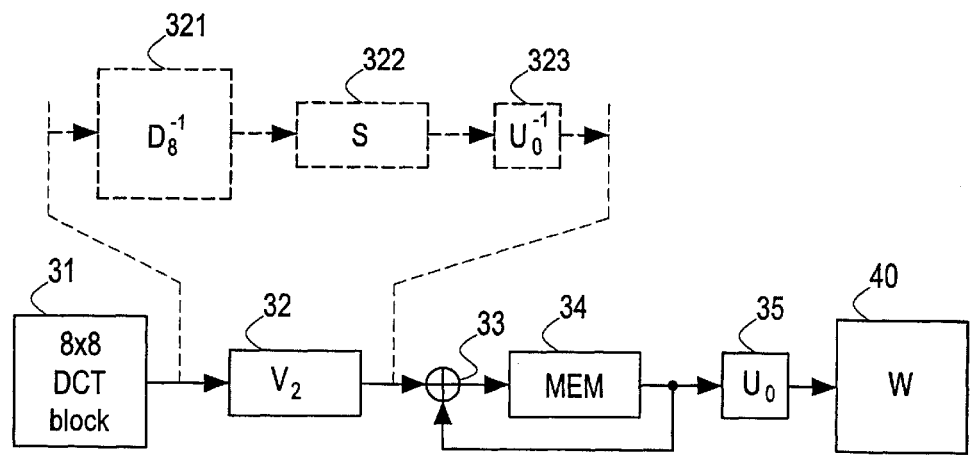
FIG. 3 shows a schematic diagram of an arrangement for accumulating frame-encoded macroblocks in accordance with the invention.

FIG. 3 shows a schematic diagram of an arrangement for accumulating a plurality of frame-encoded macroblocks according to the method of the invention. The arrangement receives an 8×8 frame-encoded DCT block 31 (i.e. one of the blocks from macroblock denoted 14 in FIG. 1). The DCT block is multiplied 32 with an 8×4 sparse matrix $V_2$. This multiplication yields an 8×4 block of intermediate values, which is indicative of the sum of the two fields. An adder 33 and a memory 34 accumulate as many intermediate blocks as necessary for the application in question (e.g. watermark detection). Upon completion of the accumulation, the accumulated blocks are subsequently subjected to an inverse basis transform by multiplication 35 with a matrix $U_o$. Finally, the actual application (here watermark detection 40) is carried out.

Note that the accumulation memory 34 in FIG. 3 is an 8×4 memory (in the Figure, each element has been drawn in proportion with the actual matrix size, e.g. 8×8, 8×4, or 4×4). In practice, two memories 34 are required, one for accumulating the 4 lines derived from the upper DCT block of a macroblock, and one for accumulating the 4 lines derived from the corresponding lower DCT block. Collectively, they constitute a field-based memory (i.e. a 128×128 buffer in the case of watermark detection).

As has been attempted to show with dashed lines in FIG. 3, the matrix $V_2$ represents a combination of three mathematical operations. The first and second operations are an inverse DCT 321 and a summation 322 of the two fields, respectively. As described in the introductory paragraphs, it is not attractive to physically carry out the inverse DCT on each received DCT block. The arrangement avoids this by mathematically subjecting the result of the two operations 321 and 322 to a basis transform 323. This basis transform is denoted $U_0^{-1}$ in FIG. 3. The unconventional notation $U_0^{-1}$ is used in this patent application for the basis transform itself, whereas the notation $U_0$ is used for the inverse basis transform. The reason is that the basis transform 323 is only a mathematical notion, whereas the inverse basis transform 35 is physically executed by the arrangement.

The invention also advantageously exploits the insight that the inverse DCT 321 needs to be carried out in the vertical direction only. The inverse horizontal DCT (necessary if the application 40 needs to process the accumulated fields in the pixel domain), can be postponed until after completion of the inverse basis transform 35. Accordingly, the inverse DCT operation 321 is performed by multiplying the DCT block 31 with a matrix $D_8^{-1}$. The latter matrix is the inverse of the well-known 8-point DCT:

$$(D_N)_{kn} = \sqrt{\frac{2}{N}} C_k \cos\left(\frac{2\pi\left(n+\frac{1}{2}\right)k}{N}\right); C_k = \begin{cases} \frac{1}{\sqrt{2}} & \text{for } k = 0 \\ 1 & \text{for } 1 \leq k < N - 1 \end{cases} \quad (1)$$

The matrix S in FIG. 3 is the matrix representation of the summation of odd and even lines:

$$S = \begin{bmatrix} 1 & 1 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \end{bmatrix}$$

The matrix $V_2$, which physically replaces the three matrices $D_8^{-1}$, $S$, and $U_0^{-1}$ can be mathematically expressed as:

$$V_2 = U_0^{-1} \cdot S \cdot D_8^{-1}$$

The basis transform $U_0^{-1}$ can be chosen arbitrarily, provided that an inverse transform $U_0$ exists. The invention resides in selecting a basis transform such that the matrix $V_2$ is sparse, i.e. has many zeroes. The inventors have found that the basis transform $$U_0^{-1} = D_4$$

is a clever choice, where $D_4$ is the 4-point DCT (see equation 1). This choice results in the following matrix:

$$V_2 = \begin{bmatrix} \alpha_0 & 0 & 0 & 0 & 0 & 0 & 0 & 0 \\ 0 & \alpha_1 & 0 & 0 & 0 & 0 & 0 & \alpha_7 \\ 0 & 0 & \alpha_2 & 0 & 0 & 0 & \alpha_6 & 0 \\ 0 & 0 & 0 & \alpha_3 & 0 & \alpha_5 & 0 & 0 \end{bmatrix}; \quad (2)$$

$$\alpha_k = \sqrt{2} \cos\left(\frac{\pi k}{16}\right) \text{sgn}(4-k)$$

The matrix $V_2$ is extremely sparse. Multiplication with DCT block 31 requires only one multiplication per DCT coefficient, which can easily be done on-the-fly. It can be shown that a matrix having fewer non-zeroes than this one does not exist.

Figure 2:
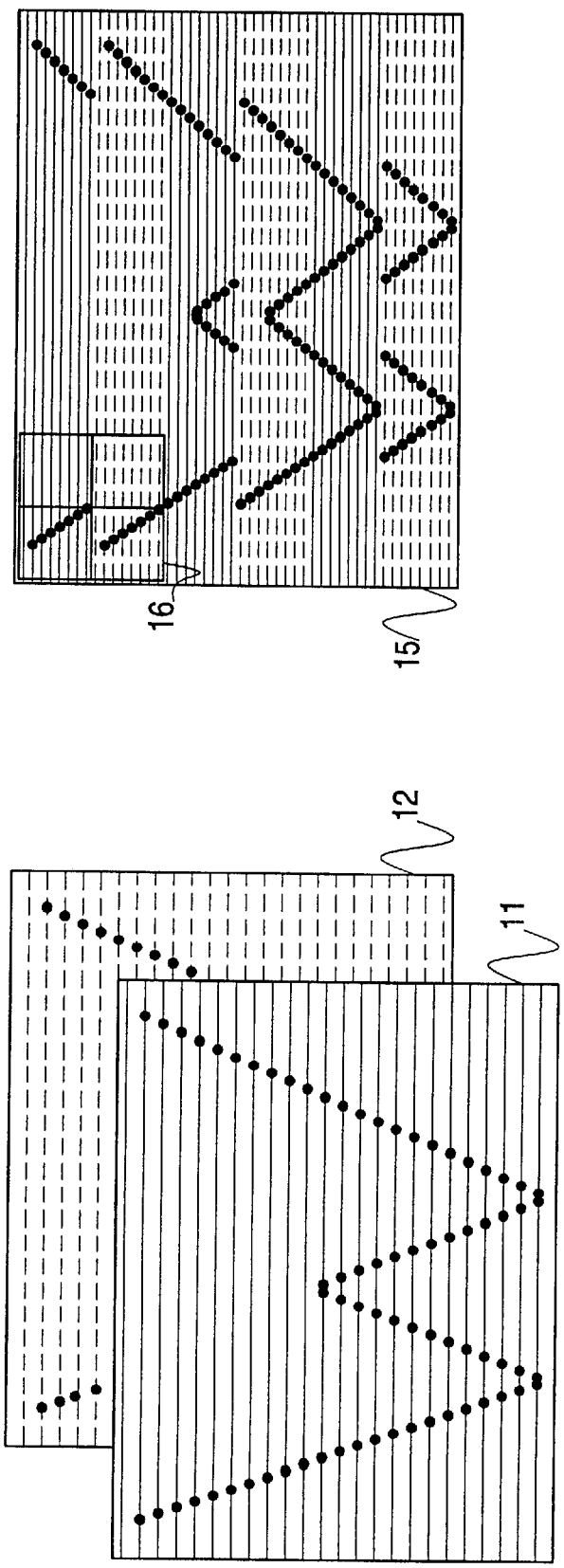

As already mentioned in the introductory paragraphs, MPEG's frame-encoded pictures are generally composed of a mix of frame-encoded macroblocks (FIG. 1) and field-encoded macroblocks (FIG. 2). It is not possible to directly add field-encoded blocks to the $V_2$-transformed frame-encoded blocks accumulated in memory 34, because they live in different bases. This causes a problem when different blocks of the same frame need to be added together, or when a plurality of frames need to be added together (both situations occur in the watermark detector mentioned in the introductory paragraphs).

Figure 4:
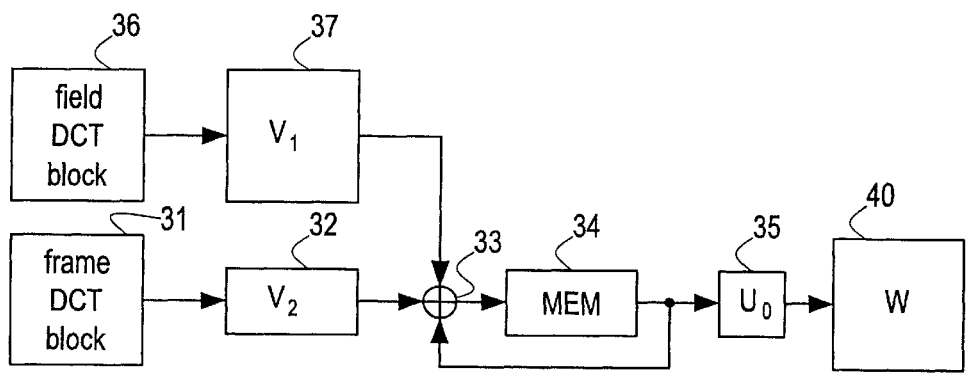
FIG. 4 shows a schematic diagram of an embodiment of an arrangement for accumulating a mix of frame-encoded blocks and field-encoded blocks in accordance with the invention.

FIG. 4 shows a schematic diagram of an embodiment of the arrangement which is arranged to accumulate a mix of frame-encoded blocks and field-encoded blocks in accordance with the invention. In this embodiment, field-encoded DCT blocks 36 are transformed to the same basis as the $V_2$-transformed frame-encoded DCT blocks 31 by multiplying 37 them with a further matrix $V_1$. For consistency, the matrix $V_1$ must be:

$$V_1 = \begin{bmatrix} D_4 & O_4 \\ O_4 & D_4 \end{bmatrix} \cdot D_8^{-1} = \begin{bmatrix} 0.707 & 0.641 & 0 & -0.225 & 0 & 0.15 & 0 & -0.127 \\ 0 & 0.294 & 0.707 & 0.559 & 0 & -0.249 & 0 & 0.196 \\ 0 & -0.053 & 0 & 0.363 & 0.707 & 0.543 & 0 & -0.265 \\ 0 & 0.016 & 0 & -0.069 & 0 & 0.347 & 0.707 & 0.612 \\ 0.707 & -0.641 & 0 & 0.225 & 0 & -0.15 & 0 & 0.127 \\ 0 & 0.294 & -0.707 & 0.559 & 0 & -0.249 & 0 & 0.196 \\ 0 & 0.053 & 0 & -0.363 & 0.707 & -0.543 & 0 & 0.265 \\ 0 & -0.016 & 0 & -0.069 & 0 & 0.347 & -0.707 & 0.612 \end{bmatrix} \quad (3)$$

where $D_4$ is the 4-point DCT transform (see equation (1)) and $O_4$ is the 4×4 0-matrix. Unfortunately, the matrix $V_1$ is not considerably sparse. However, it can be approximated by:

$$V_1 = \frac{1}{\sqrt{2}} \begin{bmatrix} 1 & 1 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \\ 1 & -1 & 0 & 0 & 0 & 0 & 0 & 0 \\ 0 & 0 & -1 & 1 & 0 & 0 & 0 & 0 \\ 0 & 0 & 0 & 0 & 1 & -1 & 0 & 0 \\ 0 & 0 & 0 & 0 & 0 & 0 & -1 & 1 \end{bmatrix} \quad (4)$$

which is sparse in the sense that it requires one multiplication per DCT coefficient (all multiplications are identical up to a sign).

Using the $V_1$-matrix of equation (4) instead of the proper definition in equation (3) captures 85% of the energy in field-encoded macroblocks, assuming a uniform distribution of DCT coefficients.

The inventors have found that it is possible to do better than this by slightly modifying the basis transform $U_0$ such that more field-encoded energy is captured, although as a consequence thereof some frame-encoded energy is lost. Assuming that there is significantly more energy in frame-encoded macroblocks than in field-encoded macroblocks, the corresponding matrices $V_2$ and $V_1$ are:

$$V_2 = \begin{bmatrix} a_0 b_0 & 0 & 0 & 0 & 0 & 0 & 0 & 0 \\ 0 & a_1 b_1 & 0 & 0 & 0 & 0 & 0 & a_7 b_7 \\ 0 & 0 & a_2 b_2 & 0 & 0 & 0 & a_6 b_6 & 0 \\ 0 & 0 & 0 & a_3 b_3 & 0 & a_5 b_5 & 0 & 0 \end{bmatrix}, \text{ and}$$

$$V_1 = \frac{1}{\sqrt{2}} \begin{bmatrix} a_0 & a_1 & 0 & 0 & 0 & 0 & 0 & 0 \\ 0 & 0 & a_2 & a_3 & 0 & 0 & 0 & 0 \\ 0 & 0 & 0 & 0 & a_4 & a_5 & 0 & 0 \\ 0 & 0 & 0 & 0 & 0 & 0 & a_6 & a_7 \\ a_0 & -a_1 & 0 & 0 & 0 & 0 & 0 & 0 \\ 0 & 0 & a_2 & a_1 & 0 & 0 & 0 & 0 \\ 0 & 0 & 0 & 0 & a_4 & -a_5 & 0 & 0 \\ 0 & 0 & 0 & 0 & 0 & 0 & -a_6 & a_7 \end{bmatrix},$$

where $\alpha_k$ is the same as in equation (2), and $a_i$ and $b_i$ are chosen in accordance with the video image statistics. With the following formulas, $a_i$ and $b_i$ can be calculated for video sequences having a variance $\sigma_i^2$ of the $i^{th}$ DCT coefficient of the columns of frame-encoded DCT blocks and a variance $\tau_i^2$ of the $i^{th}$ DCT coefficient of the columns of field-encoded DCT blocks:

$$b_i = b_{8-i} = a_{2i} = \frac{1}{1 + (U_{(i+2)\bmod 4, i})^2}; i = 0, 1, 2, 3$$

$$a_{2i+1} = \frac{G_{i,i} + G_{i,(i+2)\bmod 4} U_{(i+2)\bmod 4, i}}{1 + (U_{(i+2)\bmod 4, i})^2}; i = 0, 1, 2, 3$$

where:

$$G = \begin{bmatrix} 0.9061 & 0 & -0.0747 & 0 \\ 0 & 0.7911 & 0 & -0.0975 \\ 0.2126 & 0 & -0.7682 & 0 \\ 0 & 0.2778 & 0 & 0.8657 \end{bmatrix};$$

$$U = \begin{bmatrix} 1 & 0 & U_{02} & 0 \\ 0 & 1 & 0 & U_{13} \\ U_{20} & 0 & 1 & 0 \\ 0 & U_{31} & 0 & 1 \end{bmatrix};$$

$$U_{ij} = -\Gamma_{ij} + \sqrt{\Gamma_{ij}^2 + 1};$$

$$\Gamma_{ij} = \frac{\sigma_j^2 \alpha_j^2 + \sigma_{8-j}^2 \alpha_{8-j}^2 + \tau_{2j}^2 + \tau_{2j+1}^2 (G_{jj}^2 - G_{ji}^2)}{2\tau_{2j+1}^2 G_{jj} G_{ji}}; j = i + 2 \bmod 4$$

Generally, $a_i$ and $b_i$ are close to one, so that the matrices substantially resemble the ones defined in equations (2) and (4).

The invention can be summarized as follows. For some video processing applications, most notably watermark detection (40), it is necessary to add or average (parts of) the two interlaced fields which make up a frame. This operation is not trivial in the MPEG domain due to the existence of frame-encoded DCT blocks. The invention provides a method and arrangement for adding the fields without requiring a frame memory or an on-the-fly inverse DCT. To this end, the mathematically required operations of inverse vertical DCT (321) and addition (322) are combined with a basis transform (323). The basis transform is chosen to be such that the combined operation is physically replaced by multiplication with a sparse matrix (32). Said sparse matrix multiplication can easily be executed on-the-fly. The inverse basis transform (35) is postponed until after the desired addition (33, 34) has been completed.

What is claimed is:

1. A method of adding field images of an interlaced video frame image received in the form of frame-encoded transform blocks obtained by an image transform (DCT), the method comprising the steps of:

multiplying said transform blocks with a sparse matrix ($V_2$) which is representative of the inverse ($D_8^{-1}$) of said image transform, field addition (S), and a predetermined basis transform ($U_0^{-1}$); and subjecting the multiplied transform blocks to the inverse ($U_0$) of said predetermined basis transform.

2. The method as claimed in claim 1, wherein the interlaced video frame image is received as an MPEG encoded frame; said sparse matrix ($V_2$) is substantially equal to:

$$V_2 = \begin{bmatrix} \alpha_0 & 0 & 0 & 0 & 0 & 0 & 0 & 0 \\ 0 & \alpha_1 & 0 & 0 & 0 & 0 & 0 & \alpha_7 \\ 0 & 0 & \alpha_2 & 0 & 0 & 0 & \alpha_6 & 0 \\ 0 & 0 & 0 & \alpha_3 & 0 & \alpha_5 & 0 & 0 \end{bmatrix}; \alpha_k = \sqrt{2} \cos\left(\frac{\pi k}{16}\right) \text{sgn}(4-k),$$

said basis transform is the 4-point discrete cosine transform.

3. The method as claimed in claim 1, wherein the interlaced video frame is received as a mix of frame-encoded transform blocks and field-encoded transform blocks, the method comprising the further steps of multiplying the field-encoded transform blocks with a further matrix ($V_1$), and adding the multiplied field-encoded transform blocks to the multiplied frame-encoded transform blocks.

4. The method as claimed in claim 3, wherein the further matrix ($V_1$) is:

$$V_1 = \begin{bmatrix} D_4 & O_4 \\ O_4 & D_4 \end{bmatrix} \cdot D_8^{-1},$$

where $D_4$ and $D_8$ are the 4-point and 8-point discrete cosine transform, respectively.

5. The method as claimed in claim 3, wherein the further matrix ($V_1$) is substantially equal to:

$$V_1 = \frac{1}{\sqrt{2}} \begin{bmatrix} 1 & 1 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \\ 1 & -1 & 0 & 0 & 0 & 0 & 0 & 0 \\ 0 & 0 & -1 & 1 & 0 & 0 & 0 & 0 \\ 0 & 0 & 0 & 0 & 1 & -1 & 0 & 0 \\ 0 & 0 & 0 & 0 & 0 & 0 & -1 & 1 \end{bmatrix}.$$

6. An arrangement for adding field images (11, 12) of an interlaced video frame image (13) received in the form of frame-encoded transform blocks (14, 31) obtained by an image transform (DCT), the arrangement comprising:

means (32) for multiplying said transform blocks with a sparse matrix ($V_2$) which is representative of the inverse (321) of said image transform, field addition (322), and a predetermined basis transform (323); and means (35) for subjecting the multiplied transform blocks to the inverse ($U_0$) of said predetermined basis transform.

7. The arrangement as claimed in claim 6, wherein the interlaced video frame is received as a mix of frame-encoded transform blocks (14, 31) and field-encoded transform blocks (16, 36), the arrangement further comprising means (37) for multiplying the field-encoded transform blocks with a further matrix ($V_1$), and adding (33) the multiplied field-encoded transform blocks to the multiplied frame-encoded transform blocks.

8. A method of detecting a watermark embedded in the fields of a plurality of interlaced video frames received in the form of frame-encoded transform blocks (14, 31) obtained by an image transform (DCT), the method comprising the steps of:

multiplying said transform blocks with a sparse matrix ($V_2$) which is representative of the inverse ($D_8^{-1}$) of said image transform, field addition (S), and a predetermined basis transform ($U_0^{-1}$);

accumulating (33) spatially corresponding ones of said multiplied transform blocks in a buffer (34);

subjecting the accumulated multiplied transform blocks to the inverse ($U_0$) of said predetermined basis transform; and detecting the watermark in said buffer.

9. The method as claimed in claim 8, wherein the interlaced video frame is received as a mix of frame-encoded transform blocks and field-encoded transform blocks, the method comprising the further steps of multiplying the field-encoded transform blocks with a further matrix ($V_1$), and accumulating (33) spatially corresponding ones of said multiplied field-encoded transform blocks in said buffer (34).

* * * * *